F. E. HATCH.
APPARATUS FOR TREATING ORES.
APPLICATION FILED MAY 23, 1908.

946,727.

Patented Jan. 18, 1910.

3 SHEETS—SHEET 1.

F. E. HATCH.
APPARATUS FOR TREATING ORES.
APPLICATION FILED MAY 23, 1908.

946,727.

Patented Jan. 18, 1910.

3 SHEETS—SHEET 2.

Witnesses:
Harry R. L. White
R. A. White

Inventor
Francis E. Hatch
By Foree Bain and May
Attys

UNITED STATES PATENT OFFICE.

FRANCIS E. HATCH, OF PELLSTON, MICHIGAN.

APPARATUS FOR TREATING ORES.

946,727.  Specification of Letters Patent.  Patented Jan. 18, 1910.

Application filed May 23, 1908. Serial No. 434,462.

*To all whom it may concern:*

Be it known that I, FRANCIS E. HATCH, a citizen of the United States, residing at Pellston, in the county of Emmett and State of Michigan, have invented certain new and useful Improvements in Apparatus for Treating Ores, of which the following is a specification.

My invention relates to improvements in apparatus for treating ores, and more particularly to apparatus for treating sulfid ores of metals to extract the metals therefrom.

One of the salient objects of my invention is to provide an apparatus whereby provision is made for the practice of a continuous process of extracting metal ores, and further to provide means for utilizing in such process the sulfurous fumes or gases evolved from the ores.

Figure 1:
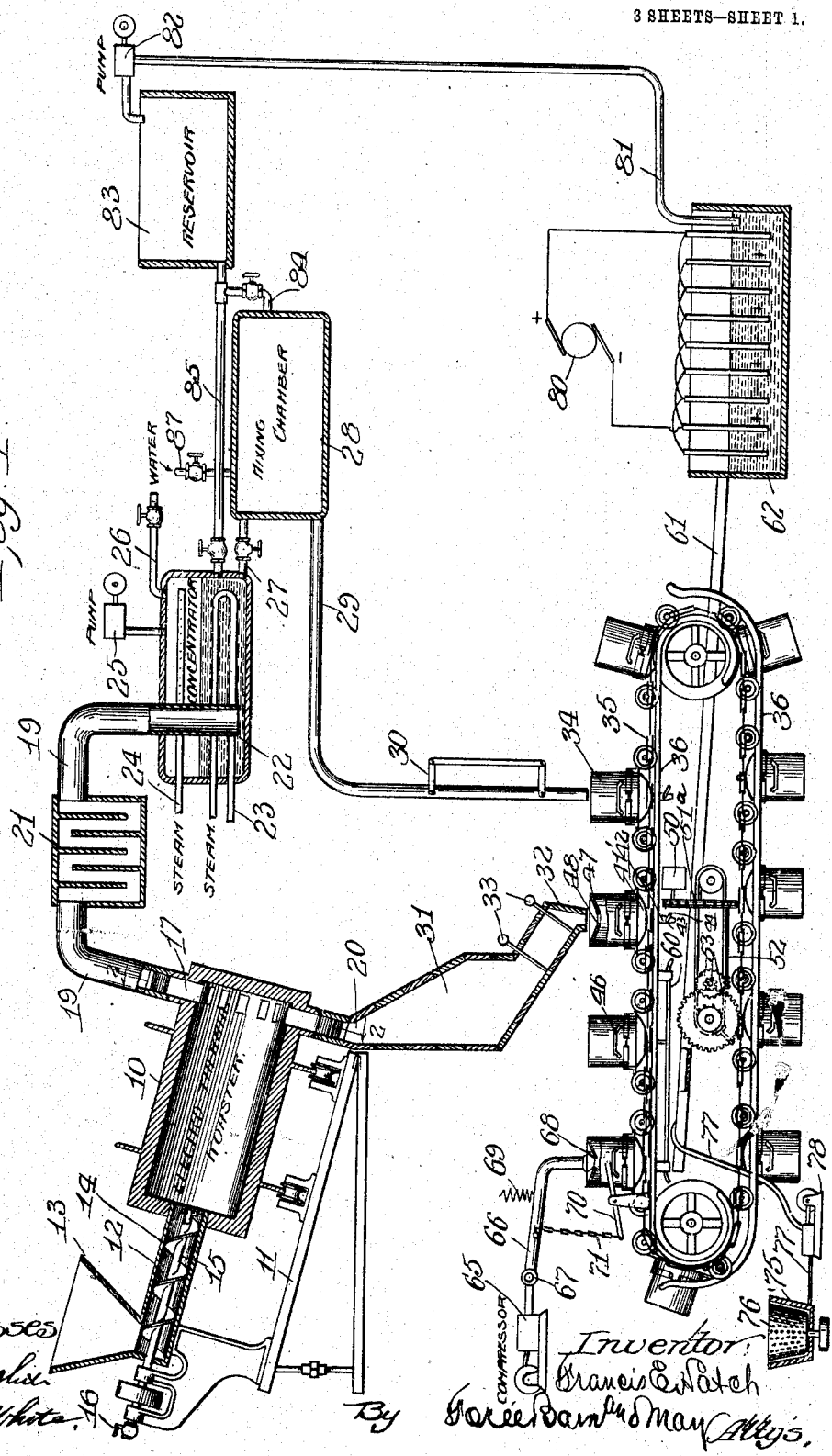
Figure 2:
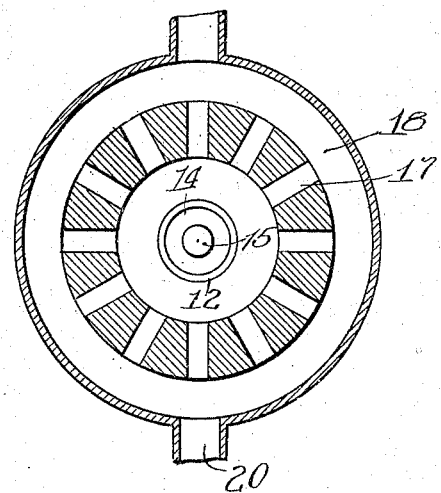
Figure 3:
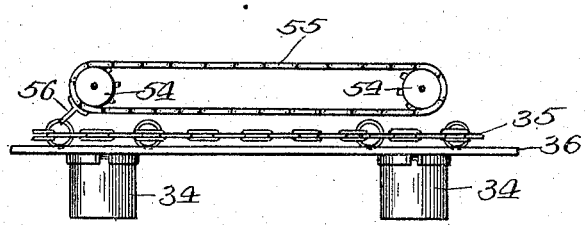
Figure 4:
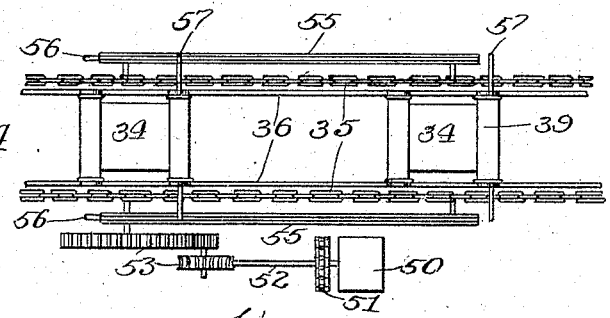
Figure 5:
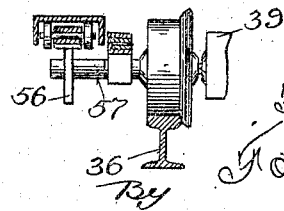
Figure 6:
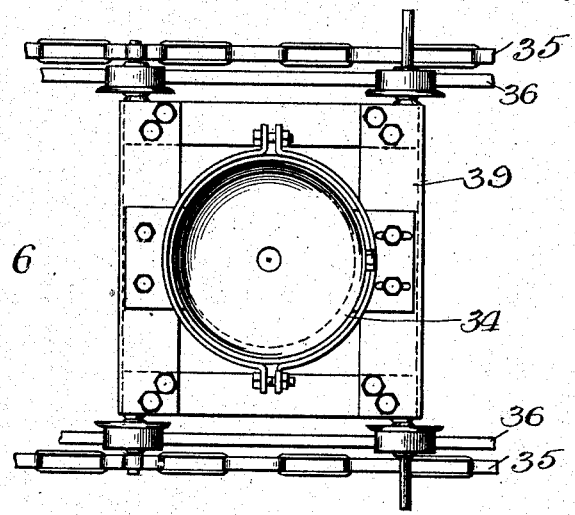
Figure 7:
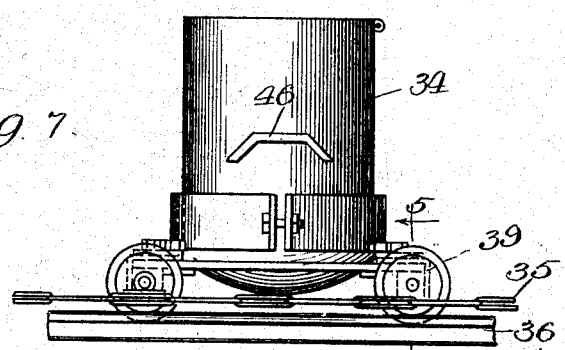
Figure 8:
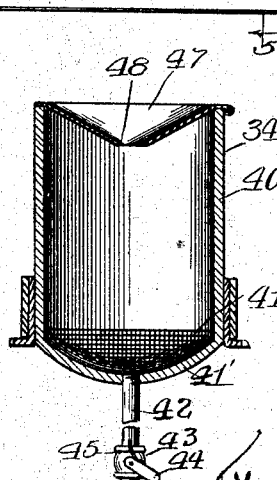

Further objects of my invention are to improve generally and in detail the apparatus and mechanical appliances employed in an ore reduction plant of the character described as will more fully appear from the following description taken in conjunction with the accompanying drawings, wherein;

Figure 1 is a diagrammatic view illustrating a plant embodying my invention; Fig. 2 is a section on line 2—2 of Fig. 1; Figs. 3 and 4 are side and plan views of driving mechanism for a leaching receptacle flight; Fig. 5 is a section taken on line 5—5 of Fig. 7. Figs. 6 and 7 are plan and side elevation of a leaching receptacle, and; Fig. 8 is a sectional view thereof.

In the system illustrated I provide an electrothermal roaster generally indicated at 10, which may be of any improved type, it being my preference to employ roasters constructed substantially as shown in my United States Letters Patent No. 741,333, dated Oct. 13th, 1903, save in the details hereinafter pointed out, said roaster being mounted for rotation upon an inclined platform 11, which is provided at its upper end with a feed chute 12 to which opens a hopper 13, the feed chute having arranged therein a screw conveyer 14, the shaft 15 of which constitutes an air pipe controlled at its outer end by a valve 16. Such a roaster typifies an oven heated without the presence of carboniferous products of combustion therein. At its lower end the roaster is provided with a series of radially extending outward openings 17, opening into a common ring or annular channel 18, from which extends respectively at the top and bottom of the ring a gas flue 19 and a material chute 20, such parts typifying suitable paths for the separation of the sulfurous gases from the desulfurized residuum. The gas flue 19 leads to a gravity separator 21 of any desired construction, (which may in some instances be omitted) and thence to a concentrator chamber 22 of suitable form and capacity, adapted to contain a water body into which the extremity of the pipe 19 preferably opens, and provided with an attemperating coil 23 and a steam condensing pipe 24, or other suitable apparatus for concentration of the sulfurous gases may be used. An exhaust pump 25 is preferably provided in communication with the concentrator 22 to exhaust air therefrom to insure circulation of the gases through the flue 19, and a water pipe 26 is provided to supply water to the concentrator as desired. From the concentrator 22 a valved pipe connection 27 is preferably made to a mixing chamber 28 of suitable construction, from which leads a solvent feed pipe 29, extending to a suitable point with reference to the leaching apparatus, and provided with a trapping valve arrangement, of any suitable form, generally indicated as a double valve rigging 30 and not shown in detail; the trapping or measuring valve arrangement 30 being such as to permit the passage of a definite quantity of liquid at each operation of the valves. The material chute 20 opens to a material reservoir 31, having at its lower end a feed spout 32 controlled by trapping valves 33, by the operation of which a definite quantity of material may be trapped out through the spout 32.

Below the pipe 29 and spout 32 is arranged a leaching apparatus, which preferably consists of a series of receptacles 34 connected together as by chains 35 and arranged to run upon a track 36, preferably in the form of a conveyer flight of suitable design, so that the endless chain of receptacles pass below the feeding apparatus on its upper course or leg and returns upsidedown on the lower course. Each of the receptacles 34, as best indicated in Figs. 6 and 8, is preferably mounted upon a small car or carriage 39, each such receptacle comprising a vessel or body 40, provided with a perforated false bottom 41, which may be in the form of a wire screen, as shown in Fig. 8, or preferably in the form of a finely perforated bottom, the false bottom being separated from the true bottom, 41', a slight distance, and the true bottom being provided with a drain outlet 42, having at its lower end a valve 43 provided with a handle 44 normally held closed as by the spring 45. Upon the exterior of each receptacle is provided a cam projection 46 as shown, and each receptacle is preferably provided with a hinged top 47 of generally a hopper shape, having at its bottom an opening 48.

The flight or receptacles 34 may be driven step by step in any way, the arrangement herein shown and preferred comprising a motor 50 arranged to impart power through a chain gear $51^a$, countershaft 52, and reducing gear 53, to drive a sprocket 54 which operates a chain 55 carrying a finger 56, arranged to engage with a suitable part of one of the conveyers on the lower leg of the flight, the carriage for the receptacle to this end being provided with axle projection 57, as best shown in Fig. 5. Preferably two chains 55 are provided so that the strain is equally divided on opposite sides of the flight of receptacles. By this arrangement a step by step movement is imparted to the flight, the conveyers being driven forward a unit of distance during each half revolution of the finger 56, and allowed to dwell or remain at rest during the balance of its revolution, and the conveyers are spaced apart a distance equal to such unit length of movement, so that each step advances all of the conveyers one position. The arrangement of the conveyers relative to the end of pipe 29 and spout 33 is such that each time one conveyer is brought into position for a dwell, one receptacle is positioned immediately below the spout 32 while another receptacle is positioned to receive matter from the trapping valves of pipe 29.

At a point in the rear of the spout 32 a valve tripping rail 60 is provided in such relation to the track 36 as to trip and hold open the drain valve 44 of the receptacles 34, and below the positions occupied by the receptacles while their drain valves are so opened is arranged a trough 61 leading to an electrolytic bath 62 to be described.

At one of the dwell points of the receptacles within the range of operations of the valve-tripping rail 16, I provide an air delivery apparatus, consisting preferably of a compressor 65, having connected thereto an air pipe 66, controlled by a valve 67, the pipe 66 being preferably hinged in such manner as to open the valve 67 when depressed and provided at its extremity with a head 68 arranged to fit snugly in the opening 48 in the hinged cover of a receptacle positioned therebeneath. A spring 69 normally holds the pipe 66 elevated, but the latter may be depressed through a lever 70 connected to the pipes as by a chain 71, the lever 70 being arranged to be elevated during the dwell of each receptacle thereebeneath by the engagement of the cam projection 46 upon the side of the receptacle with the extremity of the lever. Thus as each receptacle comes into proper position the pipe is drawn down and a blast of air from the compressor is blown through the receptacle. Below the position where the receptacle turns from its upper course to its lower course is arranged a centrifugal separator 75, having a porous or reticulated interior receiving member 76, suitably driven in rapid rotation and arranged to receive the contents of the various receptacles as dumped, provision being made for pumping the solution centrifugally from the reticulated inner vessel back to the trough 61, and through the medium of a pipe 77, leading from the outer vessel of the separator and a pump 78 connected to such pipe.

The electrodeposition bath 62 may be of the usual construction providing the anodes and cathodes suitably connected with an electric generator 80, and for removing superflous liquid from the tank 62 I provide a pipe 81 and a pump 82 delivering such superfluous liquid into a reservoir 83, having a valved piping connection 84 with the mixing chamber 28 and a second valved piping connection 85 with the concentrating tank 22, said mixing tank 28 having in addition to the pipes heretofore described a water pipe 87 leading thereto.

In the operation of a system constructed as above described the sulfid ore of the metal such as copper in a finely powdered state is fed into the hopper 13 whence it is continuously fed by the conveyer screw 14 (together with a suitable and regulable supply of air introduced through the valved pipe 15,) into the rotary roaster 10, which serves to raise the temperature of the ore to a sufficient heat (say 900° to 1,000° F. more or less) at which the sulfurous gases are evolved from the ore. At the lower end of the roaster the gases escaping through the outlet 17 are led away at the top through the duct 19, while the desulfurized residuum of the ore is led off through the passage 20 to the reservoir 31. The sulfurous fumes thus collected are led through the gravity settling chamber 21 and thence to the concentrator tank 22, where they are suitably combined with water and steam and maintained at proper temperature by the attemperating coil, so that by combination of the sulfurous fumes with the water or steam a solvent acid is produced, circulation of the sulfurous fumes from the roaster to the concentrator being preferably positively induced by the pump 25. From the concentrator the solvent acid is led through the mixing chamber 28 and pipe 29 to the trapping valve 30 where a predetermined quantity thereof is delivered to each successive leaching receptacle as it comes into register therewith, the strength of the acid supplied being varied by the dilution of the contents of the mixing chamber with water or with the solution from the electrodeposition bath supplied from the reservoir 83. The residuum to the roaster passing by gravity into the reservoir 31 is trapped by a valve 33 into the spout 32, from which it passes into the appropriate leaching receptacle 34, previously supplied with the solvent fluid, which combines with the metal of the ore to form a metallic solution. At the next succeeding stage of the operation one or more conveyers are advanced, the valve of the leaching receptacle is opened and the solution allowed to drain off into the trough 61 in which it runs to the electro-deposition tank. Furthermore to effect more perfect extraction of the solution from the residuum, the material within the conveyer is treated with a blast of air in the compressor 65 and then in the centrifugal separator 75, from which such solution as is extracted is led back to the trough 61. In the deposition bath 62 the metallic solution is treated in the ordinary manner to secure the deposition of the metal upon the cathodes, and as the solution is constantly being introduced the surplus solvent may be continuously drawn off by pump 82 to the reservoir 83.

It will be understood that all of the parts subjected to the action of the solvent acid are made of or coated with lead or other acid-resistant material in ordinary fashion.

It will be apparent that the apparatus described provides a convenient means for continuously treating sulfid ores of metal by leaching and electrodeposition, and for the utilization of the sulfurous by-products of the roasting operation in the continuous production of a solvent for use in leaching.

While I have herein described in some detail a specific embodiment of my invention which I believe to be new in many of its details, it will be apparent to those skilled in the art that numerous changes in the specific construction and arrangement of devices might be made without departure from the spirit and scope of my invention, and I do not desire to be understood as limiting myself in its broadest aspect to the particular details of construction herein shown and described for purposes of illustration.

Having thus described my invention, what I claim is:

1. In a system of the character described, an electro-thermal roaster mounted for rotation on an inclined axis, and provided at its lower end with a series of ports, an annular ring into which said ports continually open, separate gas and material paths leading from said ring, and means for constantly feeding material to the upper end of said roaster.

2. In a system of the character described, means for roasting sulfid ores of metal to drive off sulfurous fumes therefrom, a flue constantly communicating with said roaster to afford a path of escape for said fumes, a chute for receiving the de-sulfurized residuum of the ore, concentrating means having communication with a flue for concentrating the fumes into a solvent acid, a series of moving leaching receptacles, and means for directing the de-sulfurized residuum of the ore and the solvent acid, to said leaching receptacles.

3. In a system of the character described, means for continuously treating sulfid ore to de-sulfurize such ore, means for collecting the sulfurous fumes and converting them into solvent acids, delivering means for the de-sulfurized residuum and the solvent acid, and a series of leaching receptacles arranged for operation to be successively presented to such delivering means.

4. In a system of the character described, means for continuously treating sulfid ore to de-sulfurize such ore, means for collecting the sulfurous fumes and converting them into solvent acid, delivering means for the de-sulfurized residuum and the solvent acid, an endless flight of leaching receptacles, and means for operating said receptacle flight to successively present the receptacles to the delivering means.

5. In a system of the character described, means for feeding continuously supplied ore to drive out sulfurous fumes therefrom, means for the continuous separate collection of the de-sulfurized residuum and the sulfurous fumes, means for continuous concentration of the sulfurous fumes to form a solvent acid, means for delivery of said desulfurized residuum and solvent acid, a movable leaching receptacle, arranged at predetermined times to receive material from said delivering means, and means for draining said receptacle, forcing air therethrough and dumping said receptacle at predetermined times.

6. In a system of the character described, means for feeding continuously supplied ore to drive out sulfurous fumes therefrom, means for the continuous separate collection of the desulfurized residuum and the sulfurous fumes, means for continuous concentration of the sulfurous fumes to form a solvent acid, means for delivering said desulfurized residuum and solvent acid, an endless flight of separate receptacles, each provided with a drain valve, automatic means for moving said receptacle flight to present successive receptacles to said residuum and acid delivering means, and means for subsequently automatically opening said drain apertures.

In testimony whereof I hereunto set my hand in the presence of two witnesses.

FRANCIS E. HATCH.

In the presence of—
E. C. BOGARDUS,
S. BOND.